Nov. 20, 1956  F. H. ZEITZ  2,771,019
WEEDING HOE
Filed Nov. 22, 1954
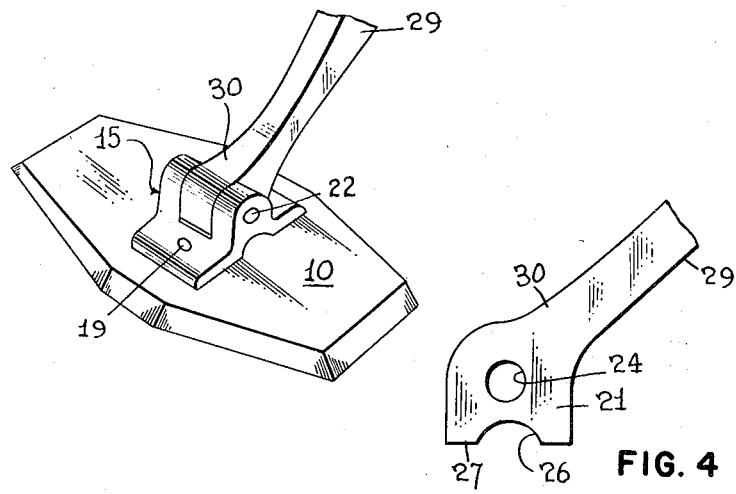
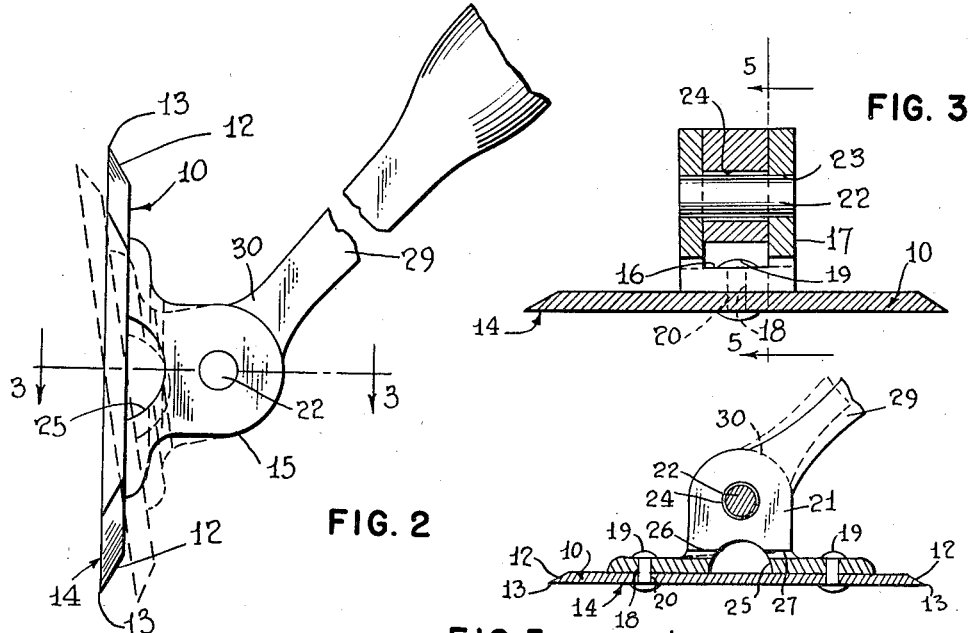
INVENTOR
FREDERICK H. ZEITZ
BY
ATTORNEY

United States Patent Office 2,771,019
Patented Nov. 20, 1956

2,771,019

WEEDING HOE

Frederick H. Zeitz, Lubbock, Tex., assignor of one-half to John D. Smith, Jr., Lubbock, Tex.

Application November 22, 1954, Serial No. 470,179

2 Claims. (Cl. 97—68)

This invention relates to agriculture and more particularly to a hoe for manual operation and in which the blade is oscillatably mounted in order to work the soil and cut weeds below the surface of the ground on both the forward and return strokes.

Hoes of various kinds have been used heretofore including some with oscillatable blades. However, in the latter the connection between the handle and the blade has been spaced substantially above the blade in order that such mounting may remain above the ground during hoeing. In addition to using an unconventional type earth-working blade the mounting of these oscillatable tools above the blade has increased the difficulty of their use over that of the conventional hoe.

Among the objects of the present invention is the provision of a flat hoe blade of conventional configuration and means for attaching the blade to a handle for oscillatable movement with respect thereto, the mounting means being so constructed and designed that the dirt may escape therefrom without interfering with its operation.

A further object is to provide an oscillatable hoe having a blade of conventional shape which is simply, sturdy and inexpensive.

These and other objects and advantages of the invention will become apparent from the following description taken in conjunction with the accompanying drawings wherein:

Fig. 1 is a perspective of a hoe in accordance with the present invention;

Fig. 2, a side elevation, to an enlarged scale, illustrating the oscillatable movement of the blade;

Fig. 3, a section on the line 3—3 of Fig. 2;

Fig. 4, a side elevation of the head member of the handle; and

Fig. 5, a section on the line 5—5 of Fig. 3.

Briefly stated, the hoe of the present invention includes a blade of substantially diamond shaped outline, the upper surface of the edges of which are beveled to serve the dual purpose of providing a cutting edge and to promote the oscillation of the blade about its mounting. Mounted on the upper surface of the blade is a clevis between the arms of which a head is oscillatably mounted on a pin. The sides of the clevis and the central undersurface of the head are slotted in order that dirt and the like may escape from the mounting. By means of a handle extending angularly from the head the implement may be moved back and forth in the soil.

Referring to the drawings the hoe has a flat blade 10 of substantially diamond shape, although the points have been removed. The upper surface has beveled edge portions 12 providing sharpened edges 13 where the beveled portions 12 meet the under-surface 14.

Mounted across the shorter dimension of the blade 10 and centrally thereof is a clevis 15 having a web portion 16 and arms 17. The web portion 16 has a pair of holes 18 by means of which fastening means 19 are connected which extend through holes 20 in the blade. Mounted intermediate the arms 17 is a head 21; a pin 22 is frictionally held in the bores 23 in the arms 17, a larger bore 24 in the head permitting oscillation of the head about the pin.

The lower portion of each of the arms 17 has an arcuate slot 25 to permit dirt and the like to escape from between the arms 17, the head 21 having an arcuate slot 26, the curvature of which is similar to that of the upper portion of slot 25. On either side of the slot 26 the lower surface of the head provides a pair of feet or stop members 27 which alternately contact the upper surface of the web 16 during oscillation of the head, the stop members being spaced slightly above the web of the clevis. Handle 29 is mounted in sleeve 30 at an angle to the head 21.

In the operation of the device the gardener pushes the hoe alternately forwardly and backwardly on the ground. Movement in either direction causes the leading cutting edge 13 to dig into the ground, the bevel 12 causing the blade to tilt downwardly so that it slices and digs beneath the surface. Upon reversal of movement the opposite edge digs into the ground in similar manner. Dirt and other foreign matter finding its way into the space under the head can escape through the slots 26 and 25 in the head and clevis, respectively.

Accordingly, the device of the present invention provides a hoe having a flat blade oscillatably connected to the handle and which cuts beneath the surface of the soil without the necessity of the operator using a chopping action as with a conventional hoe. Dirt caught on the hoe between the relatively movable elements may escape through slots beneath the head and in the side of the supporting clevis.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An agricultural implement comprising a flat blade the upper edges of the surface of which are beveled to provide a cutting edge at the junction of the under-side of the blade and the beveled portion, a clevis rigidly mounted on the upper central surface of the blade and transversely of its longer dimension, said clevis having a web, fastening means extending through the web into the blade, a pair of spaced arms extending upwardly from each side of said clevis, each of said arms having an arcuate slot at the lowermost portion thereof near the upper surface of the blade, a head between the arms, a pin extending through the arms and the head, the head being oscillatably mounted on the pin, said head having a transverse slot in its bottom central portion in alignment with the arcuate slots of the arms and providing a foot on either side thereof, the head being mounted above the web and in contact with the inner surfaces of the arms whereby oscillatable movement between the arms of the clevis is possible, and a handle connected at an angle to the head.

2. A weeding hoe comprising a relatively flat elongated blade tapering from its center toward its ends, a clevis having a webbed portion mounted on said blade adjacen the central portion thereof with the web of the clevis being relatively thin but of sufficient strength to rigidify the blade, said clevis having a longitudinal slot through its central portion providing a passageway for dirt, said clevis including a pair of upstanding arms providing a handle-receiving recess therebetween with the handle-receiving recess communicating with said slot to provide for the disposal of dirt accumulating therein, a handle having a head for snug reception within said handle receiving recess, means to pivot said head to the arms of said clevis for limited oscillating movement whereby the angle between said blade and said handle may be changed in accordance with the direction of force applied by said handle on said blade, cooperating stop means on said clevis and said head to limit the extent of oscillation of the blade with respect to said head, said stop means being in close juxtaposition to said slot whereby dirt cannot accumulate to interfere with the movement between said handle and said blade.

References Cited in the file of this patent

UNITED STATES PATENTS

| | | |
|---|---|---|
| 1,091,058 | Godward | Mar. 24, 1914 |

FOREIGN PATENTS

| | | |
|---|---|---|
| 151,030 | Austria | Oct. 11, 1937 |
| 517,301 | Great Britain | Jan. 25, 1940 |
| 926,591 | France | Apr. 24, 1947 |